(12) United States Patent
Xie

(10) Patent No.: US 10,046,975 B2
(45) Date of Patent: Aug. 14, 2018

(54) SYNTHESIS OF MOLECULAR SIEVE SSZ-83

(71) Applicant: Chevron U.S.A. Inc., San Ramon, CA (US)

(72) Inventor: Dan Xie, Richmond, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 15/696,240

(22) Filed: Sep. 6, 2017

(65) Prior Publication Data

US 2018/0099876 A1     Apr. 12, 2018

Related U.S. Application Data

(60) Provisional application No. 62/406,471, filed on Oct. 11, 2016.

(51) Int. Cl.
*C01B 39/48*     (2006.01)

(52) U.S. Cl.
CPC .......... *C01B 39/48* (2013.01); *C01P 2002/72* (2013.01); *C01P 2004/03* (2013.01)

(58) Field of Classification Search
CPC .. C01B 39/48; C01B 2002/72; C01B 2004/03
See application file for complete search history.

(56) References Cited

U.S. PATENT DOCUMENTS

| 7,998,457 | B2 | 8/2011 | Burton, Jr. et al. |
| 8,075,871 | B2 | 12/2011 | Burton, Jr. et al. |
| 9,359,217 | B2 * | 6/2016 | Zones ............ C01B 39/54 |
| 2015/0087841 | A1 | 3/2015 | Weston et al. |

FOREIGN PATENT DOCUMENTS

| WO | 2010065318 A2 | 6/2010 |
| WO | 2010065319 | 6/2010 |
| WO | WO-2018071113 A1 * | 4/2018 |

OTHER PUBLICATIONS

PCT International Search Report, International Appl. No. PCT/US2017/050259, dated Oct. 19, 2017.
A. Jackowski, S.I. Zones, S-J. Hwang and A.W. Burton "Diquaternary Ammonium Compounds in Zeolite Synthesis: Cyclic and Polycyclic N-Heterocycles Connected by Methylene Chains" J. Am. Chem. Soc. 2009, 131, 1092-1100.

* cited by examiner

*Primary Examiner* — David M Brunsman
(74) *Attorney, Agent, or Firm* — Terrence M. Flaherty

(57) ABSTRACT

A method is disclosed for synthesizing a molecular sieve having the structure of SSZ-83 in the absence of a source of fluoride ions.

7 Claims, 3 Drawing Sheets

Two-Theta (deg)

SYNTHESIS OF MOLECULAR SIEVE SSZ-83

CROSS-REFERENCE TO RELATED APPLICATIONS

This application claims the benefit of U.S. Provisional Application Ser. No. 62/406,471, filed on Oct. 11, 2016, the disclosure of which is incorporated by reference in its entirety.

TECHNICAL FIELD

This disclosure is directed to a method of synthesizing molecular sieve SSZ-83.

BACKGROUND

Because of their unique sieving characteristics as well as their catalytic properties, crystalline molecular sieves and zeolites are especially useful in applications such as hydrocarbon conversion, gas drying and separation.

U.S. Pat. Nos. 7,998,457 and 8,075,871 disclose molecular sieve SSZ-83 and its synthesis using 1,4-bis(N-butylpiperidinium)butane dications or 1,4-bis(N-butylpyrrolidinium)butane dications as a structure directing agent. Although effective in producing SSZ-83, the method requires the use of fluoride ions posing potential health and safety concerns during manufacture. The use of fluoride in molecular sieve reaction gels is undesirable on a large scale because of the potential hazards involved.

There thus remains a need for a method of synthesizing molecular sieve SSZ-83 that eliminates the need for a source of fluoride yet maintains a high purity yield of the material.

The present disclosure provides a method of synthesizing molecular sieve SSZ-83 in the absence of a source of fluoride ions.

SUMMARY

In one aspect, there is provided a method of synthesizing a molecular sieve having the structure of SSZ-83, the method comprising: (a) preparing a reaction mixture comprising: (1) a source of silicon oxide; (2) a source of aluminum oxide; (3) a source of a Group 1 or 2 metal; (4) a structure directing agent comprising 1-methyl-1-(6-(trimethylammonio)hexyl)piperidinium dications; (5) a source of hydroxide ions; and (6) water; and (b) subjecting the reaction mixture to crystallization conditions sufficient to form crystals of the molecular sieve.

In another aspect, there is provided a crystalline molecular sieve having the structure of SSZ-83 and containing within its pore structure 1-methyl-1-(6-(trimethylammonio)hexyl) piperidinium dications.

DETAILED DESCRIPTION

Reaction Mixture

Figure 1:
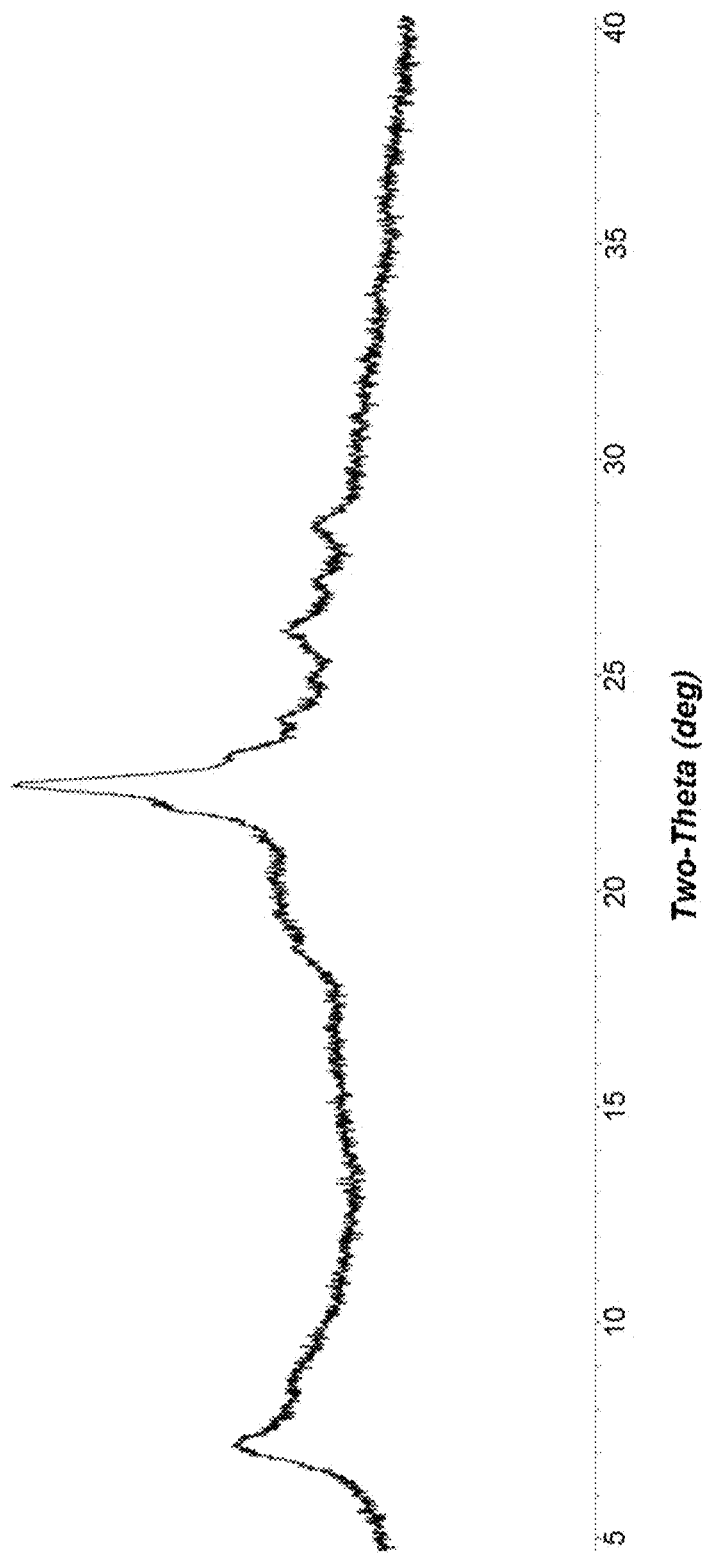
FIG. 1 is a powder X-ray diffraction (XRD) pattern of the as-synthesized molecular sieve prepared in Example 1.

In general, molecular sieve SSZ-83 is synthesized by (a) preparing a reaction mixture comprising (1) a source of silicon oxide; (2) a source of aluminum oxide; (3) a source of a Group 1 or 2 metal (M); (4) a structure directing agent (Q) comprising 1-methyl-1-(6-(trimethylammonio)hexyl)piperidinium dications; (5) a source of hydroxide ions; and (6) water; and (b) subjecting the reaction mixture to crystallization condition sufficient to form crystals of the molecular sieve.

The composition of the reaction mixture from which the molecular sieve is formed, in terms of molar ratios, is identified in Table 1 below:

TABLE 1

| Reactants | Broad | Exemplary |
|---|---|---|
| $SiO_2/Al_2O_3$ | 10 to 250 | 15 to 100 |
| $M/SiO_2$ | 0.05 to 1.00 | 0.10 to 0.50 |
| $Q/SiO_2$ | 0.01 to 0.50 | 0.05 to 0.30 |
| $OH/SiO_2$ | 0.05 to 1.00 | 0.20 to 0.70 |
| $H_2O/SiO_2$ | 10 to 60 | 15 to 40 |

Suitable sources of silicon oxide include colloidal silica, precipitated silica, fumed silica, alkali metal silicates, and tetraalkyl orthosilicates.

Suitable sources of aluminum oxide include hydrated alumina and water-soluble aluminum salts (e.g., aluminum nitrate).

Combined sources of silicon oxide and aluminum oxide can additionally or alternatively be used and can include aluminosilicate zeolites (e.g., zeolite Y) and clays or treated clays (e.g., metakaolin).

Examples of suitable Group 1 or Group 2 metals (M) include sodium, potassium and calcium, with sodium being preferred. The metal (M) is generally present in the reaction mixture as the hydroxide.

The structure directing agent (Q) comprises 1-methyl-1-(6-trimethylammonio)hexyl)piperidinium dications, represented by the following structure (1):

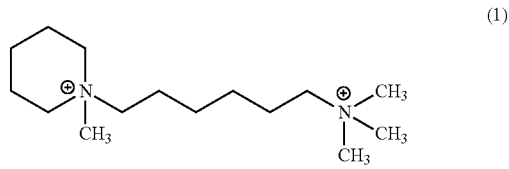 [SMILES: C[N+](C)(C)CCCCCC[N+]1(C)CCCCC1]

Suitable sources of Q are the hydroxides, chlorides, bromides, and/or other salts of the diquaternary ammonium compound.

The reaction mixture also contains a source of hydroxide ions, for example, Group I metal hydroxide such as sodium hydroxide or potassium hydroxide. Hydroxide can also be present as a counter ion of the structure directing agent.

The reaction mixture may also contain seeds of a molecular sieve material, such as SSZ-83, from a previous synthesis, desirably in an amount of from 0.01 to 10,000 ppm (e.g., from 100 to 5000 ppm) by weight of the reaction mixture.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the synthesis conditions.

Crystallization and Post-Synthesis Treatment

Crystallization of the present molecular sieve from the above reaction mixture can be carried at either static or stirred conditions in a suitable reactor vessel, such as, for example, polypropylene jar or Teflon-lined or stainless steel autoclaves, at a temperature of from 125° C. to 200° C. for a time sufficient for crystallization to occur at the temperature used (e.g., from 1 to 20 days, or 5 to 15 days). Crystallization is typically carried out in a closed system under autogenous pressure.

Once the molecular sieve crystals have formed, the solid product is recovered from the reaction mixture by standard mechanical separation techniques such as centrifugation or filtration. The crystals are water-washed and then dried to obtain the as-synthesized molecular sieve crystals. The drying step can be performed at atmospheric pressure or under vacuum. The drying step is typically performed at a temperature of less than 200° C.

As a result of the crystallization process, the recovered crystalline molecular sieve product contains within its pore structure at least a portion of the structure directing agent used in the synthesis.

The as-synthesized molecular sieve prepared as described herein may be subjected to subsequent treatment to remove part or all of the organic structure directing agent used in its synthesis. This can be conveniently effected by thermal treatment in which the as-synthesized material can be heated to a temperature of at least 370° C. for at least 1 minute and generally not longer than 24 hours. While sub-atmospheric and/or super-atmospheric pressures can be employed for the thermal treatment, atmospheric pressure may be desired for reasons of convenience. The thermal treatment can be performed at a temperature up to 925° C. Additionally or alternatively, the organic structure directing agent can be removed by treatment with ozone (see, e.g., A. N. Parikh et al., *Micropor. Mesopor. Mater.* 2004, 76, 17-22).

To the extent desired, the original metal cations (e.g., $Na^+$) of the as-synthesized molecular sieve can be replaced in accordance with techniques well known in the art by ion exchange with other cations. Suitable replacing cations include metal ions, hydrogen ions, hydrogen precursor (e.g., ammonium ions), and combinations thereof. Preferred replacing cations may include those which tailor the catalytic activity for certain hydrocarbon conversion reactions. These may include hydrogen, rare earth metals, metals of Groups 2-15 of the Periodic Table of Elements. As used herein, the numbering scheme for the Periodic Table Groups is as disclosed in *Chem. Eng. News* 1985, 63(5), 26-27.

The present molecular sieve can be formulated into a catalyst composition by combination with other materials, such as binders and/or matrix materials, which provide additional hardness or catalytic activity to the finished catalyst.

Materials which can be blended with the present molecular sieve include various inert or catalytically active materials. These materials include compositions such as kaolin and other clays, various forms of rare earth metals, other non-zeolite catalyst components, zeolite catalyst components, alumina or alumina sol, titania, zirconia, quartz, silica or silica sol, and mixtures thereof. These components are also effective in reducing overall catalyst cost, acting as a thermal sink to assist in heat shielding the catalyst during regeneration, densifying the catalyst and increasing catalyst strength. When blended with such components, the amount of SSZ-83 contained in the final catalyst product can range from 1 to 90 wt. % (e.g., 2 to 80 wt. %) of the total catalyst.

Characterization of the Molecular Sieve

In its as-synthesized and anhydrous form, molecular sieve SSZ-83 prepared as described herein has a chemical composition, in terms of molar ratios, as set forth in Table 2:

TABLE 2

|  | Broad | Exemplary |
| --- | --- | --- |
| $SiO_2/Al_2O_3$ | 10 to 100 | 15 to 50 |
| $Q/SiO_2$ | >0 to 0.1 | >0 to 0.1 |
| $M/SiO_2$ | >0 to 0.1 | >0 to 0.1 | wherein Q and M are as described herein above. The term "as-synthesized" is employed herein to refer to a molecular sieve in its form after crystallization, prior to removal of the structure directing agent. The term "anhydrous form" is employed herein to refer to a molecular sieve substantially devoid of both physically adsorbed and chemically adsorbed water.

It should be noted that the as-synthesized form of the molecular sieve may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

As taught by U.S. Pat. No. 7,998,457, molecular sieve SSZ-83 is characterized by an X-ray diffraction pattern which, in the as-synthesized form of the molecular sieve, includes at least the peaks set forth in Table 3 below and which, in the calcined form of the molecular sieve, includes at least the peaks set forth in Table 4 below.

TABLE 3

Characteristic Peaks for As-Synthesized SSZ-83

| 2-Theta[a] | d-Spacing, nm | Relative Intensity[b] |
| --- | --- | --- |
| 7.87 | 1.122 | VS |
| 8.66 | 1.020 | M |
| 19.41 | 0.457 | W |
| 21.43 | 0.414 | M |
| 21.99 | 0.404 | S |
| 22.90 | 0.388 | VS |
| 26.46 | 0.337 | W |
| 28.86 | 0.309 | W |
| 31.98 | 0.280 | W |

[a] ±0.20
[b] The powder XRD patterns provided are based on a relative intensity scale in which the strongest line in the X-ray diffraction pattern is assigned a value of 100: W = weak (>0 to ≤20); M = medium (>20 to ≤40); S = strong (>40 to ≤60); VS = very strong (>60 to ≤100).

TABLE 4

Characteristic Peaks for Calcined SSZ-83

| 2-Theta[a] | d-Spacing, nm | Relative Intensity[b] |
| --- | --- | --- |
| 7.90 | 1.118 | VS |
| 8.69 | 1.017 | M |
| 15.74 | 0.563 | W |
| 19.26 | 0.461 | W |
| 21.46 | 0.414 | M |
| 22.14 | 0.401 | M |
| 22.89 | 0.388 | VS |

TABLE 4-continued

Characteristic Peaks for Calcined SSZ-83

| 2-Theta[a] | d-Spacing, nm | Relative Intensity[b] |
|---|---|---|
| 26.34 | 0.338 | W |
| 29.01 | 0.308 | W |

[a] ±0.20
[b] The powder XRD patterns provided are based on a relative intensity scale in which the strongest line in the X-ray diffraction pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was CuK$_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the particular sample due to changes in the lattice constants. In addition, sufficiently small crystals will affect the shape and intensity of peaks, leading to significant peak broadening. Minor variations can also result from variations in the organic compound used in the preparation. Notwithstanding these minor perturbations, the basic crystal lattice remains unchanged.

EXAMPLES

The following illustrative examples are intended to be non-limiting.

Example 1

16.11 g of deionized water, 0.77 g of a 50% NaOH solution, 4.71 g of a 18.92% 1-methyl-1-(6-methylammonio)hexyl)piperidinium dihydroxide solution, and 2.00 g of CBV760 Y-zeolite (Zeolyst International, SiO$_2$/Al$_2$O$_3$ molar ratio=60) were mixed together in a Teflon liner. The resulting gel was stirred until it became homogeneous. The liner was then capped and placed within a Parr steel autoclave reactor. The autoclave was then put in an oven and heated at 160° C. for 9 days. The solid products were recovered by centrifugation, washed with deionized water and dried at 95° C.

Figure 2:
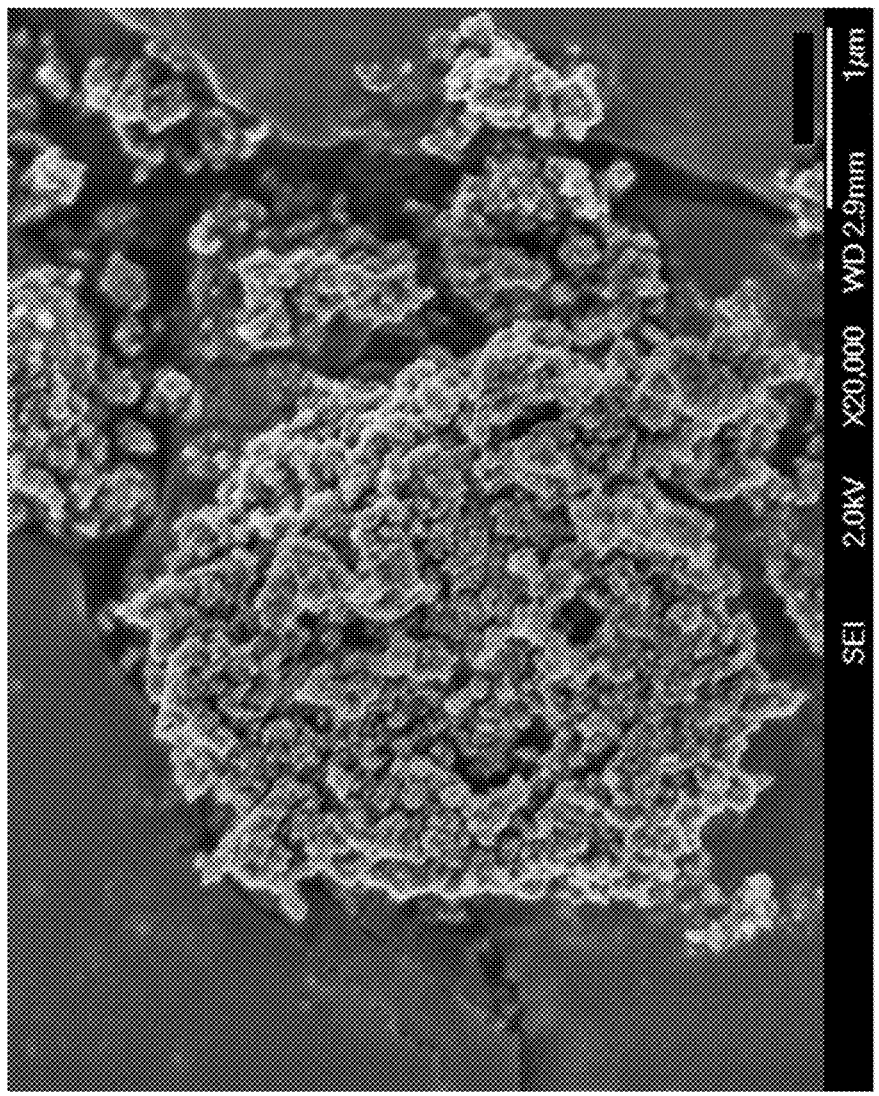
FIG. 2 is a scanning electron micrograph (SEM) image of the as-synthesized molecular sieve prepared in Example 1.

The powder XRD pattern in FIG. 1 is consistent with the product being pure SSZ-83. The SEM image in FIG. 2 shows a uniform field of crystals.

The SSZ-83 crystals had a SiO$_2$/Al$_2$O$_3$ molar ratio of 27.3, as determined by ICP elemental analysis.

Example 2

40.28 g of deionized water, 1.93 g of a 50% NaOH solution, 11.77 g of a 18.92% 1-methyl-1(6-(trimethylammonio)hexyl)piperidinium dihydroxide solution, and 5.00 g of CBV780 Y-zeolite (Zeolyst International, SiO$_2$/Al$_2$O$_3$ molar ratio=80) were mixed together in a Teflon liner. The resulting gel was stirred until it became homogeneous. The liner was then capped and placed within a Parr steel autoclave reactor. The autoclave was then put in an oven and heated at 160° C. for 8 days. The solid products were recovered by centrifugation, washed with deionized water and dried at 95° C.

The powder XRD pattern was consistent with the product being SSZ-83.

The SSZ-83 crystals had a SiO$_2$/Al$_2$O$_3$ molar ratio of 32.2, as determined by ICP elemental analysis.

Example 3

8.06 g of deionized water, 0.38 g of a 50% NaOH solution, 2.35 g of a 18.92% 1-methyl-1(6-(trimethylammonio)hexyl)piperidinium dihydroxide solution, and 1.00 g of CBV720 Y-zeolite (Zeolyst International, SiO$_2$/Al$_2$O$_3$ molar ratio=30) were mixed together in a Teflon liner. The resulting gel was stirred until it became homogeneous. The liner was then capped and placed within a Parr steel autoclave reactor. The autoclave was then put in an oven and heated at 160° C. for 10 days. The solid products were recovered by centrifugation, washed with deionized water and dried at 95° C.

Powder XRD showed the product to be a mixture of SSZ-83 and SSZ-16 (AFX framework type).

Example 4

The as-synthesized molecular sieve of Example 1 was calcined inside a muffle furnace under a flow of air heated to 595° C. at a rate of 1° C./min and held at 595° C. for five hours and cooled to ambient temperature.

Figure 3:
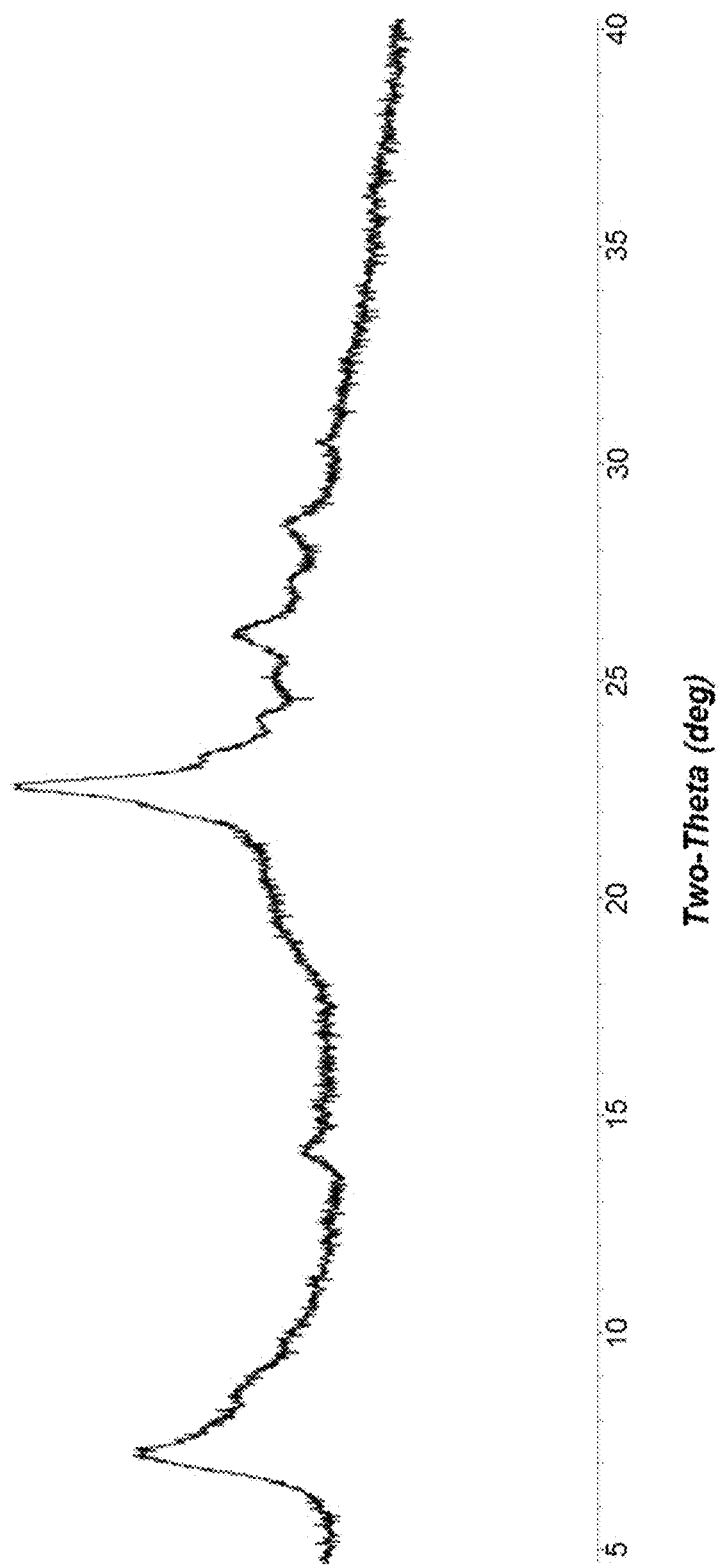
FIG. 3 is a powder XRD pattern of the calcined molecular sieve prepared in Example 4.

The powder XRD pattern of the calcined material is shown in FIG. 3.

After calcination, the molecular sieve was subjected to micropore volume analysis using N$_2$ as the adsorbate and via the B.E.T. method. From nitrogen physisorption experiments, it was determined that this sample had a micropore volume of 0.19 cm$^3$/g.

The invention claimed is:

1. A method of synthesizing a molecular sieve having the structure of SSZ-83, the method comprising:
    (a) preparing a reaction mixture comprising:
        (1) a source of silicon oxide;
        (2) a source of aluminum oxide;
        (3) a source of a Group 1 or 2 metal (M);
        (4) a structure directing agent (Q) comprising 1-methyl-1-(6-(trimethylammonio)hexyl)piperidinium dications;
        (5) a source of hydroxide ions; and
        (6) water; and
    (b) subjecting the reaction mixture to crystallization conditions sufficient to form crystals of the molecular sieve.

2. The method of claim 1, wherein the reaction mixture has a composition, in terms of molar ratios, as follows:

| | |
|---|---|
| SiO$_2$/Al$_2$O$_3$ | 10 to 250 |
| M/SiO$_2$ | 0.05 to 1.00 |
| Q/SiO$_2$ | 0.01 to 0.50 |
| OH/SiO$_2$ | 0.05 to 1.00 |
| H$_2$O/SiO$_2$ | 10 to 60. |

3. The method of claim 1, wherein the reaction mixture has a composition, in terms of molar ratios, as follows:

| | |
|---|---|
| SiO$_2$/Al$_2$O$_3$ | 15 to 100 |
| M/SiO$_2$ | 0.10 to 0.50 |
| Q/SiO$_2$ | 0.05 to 0.30 |
| OH/SiO$_2$ | 0.20 to 0.70 |
| H$_2$O/SiO$_2$ | 15 to 40. |

4. The method of claim 1, wherein crystallization conditions include a temperature of from 125° C. to 200° C.

5. A crystalline molecular sieve having the structure of SSZ-83 and containing within its pore structure 1-methyl-1-(6-(trimethylammonio)hexyl)piperidinium dications.

6. The crystalline molecular sieve of claim 5, and having a $SiO_2/Al_2O_3$ molar ratio of 10 to 100.

7. The crystalline molecular sieve of claim 5, and having a $SiO_2/Al_2O_3$ molar ratio of 15 to 50.

\* \* \* \* \*